Patented Apr. 26, 1932

1,855,591

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

INVERTASE PREPARATION AND METHOD OF MAKING THE SAME

No Drawing.   Application filed February 3, 1926. Serial No. 85,781.

This invention relates to an invertase preparation and method of making the same.

In recent years there has been a considerable development in the use of invertase, more particularly in the manufacture of confectionery and syrups. A method of using invertase in the manufacture of confectionery and the results attained thereby is set forth in the patent to Paine and Hamilton No. 1,437,816, granted December 5, 1922.

The commercial use of invertase demands what may be termed a standardized preparation, that is, a preparation which has a determined inverting power. Heretofore such preparations have been ordinarily used in the form of an aqueous solution containing invertase. Such solutions are, however, highly sensitive to deterioration when exposed to temperatures, say, above 50° C. and they have the further disadvantage that they are subject to attack by micro-organic growths, and, as a result, to decomposition from such attack. This has led to the incorporation in the invertase solution of preservatives, such as toluol. The use of such preservatives, however, is objectionable for various reasons.

I have found that it is possible to produce invertase preparation in dry or powdered form by incorporating with the invertase a protective sugar and that such preparation can be standardized, i. e. can have a determined inverting power. Such dry preparation presents marked resistance to deterioration by heat and to bacterial decomposition and its possesses certain advantages over the solutions which have been heretofore usually commercially employed.

As an illustrative example the dry invertase preparation may be prepared as follows:

An invertase solution which contains invertase of a determined inverting power is concentrated to a syrupy consistency. A sugar which is substantially non-hygroscopic and which is not converted by the invertase, such as dextrose or lactose is then added to this concentrated solution in sufficient amount to form a comparatively stiff dough. As a rule, with the invertase solution fairly well concentrated a suitable dough will be produced by adding to a given amount of the invertase syrup an equal amount of dextrose of lactose. The dough is then dried at a temperature not to exceed 50° C. and preferably around 40° C. The result will be a dry product and by properly controlling the amount and character of the invertase in the original solution, the dry product will have a determined inverting power. This dry preparation containing the protective sugar is exceedingly stable, can be used at temperatures above 50° C. without deterioration, and has various advantages from the point of view of shipment and ease of handling over the solutions heretofore generally used.

What is claimed is:

1. A preparation of invertase in dry form containing invertase of a determined inverting power and a protective sugar.

2. A preparation of invertase in dry form containing invertase of a determined inverting power and a sugar which is substantially non-hygroscopic and which is not converted by the invertase, such as dextrose or lactose in sufficient amount to form a protective agent for the invertase.

3. The method of making in dry form a preparation of invertase containing invertase of a determined inverting power, which consists in making a solution of invertase, adding a sufficient amount of a sugar which is substantially non-hygroscopic and which is not converted by the invertase, such as dextrose or lactose to form a protective agent, and drying.

4. The method of making a preparation of invertase in dry form containing invertase of a determined inverting power, which consists in making a concentrated solution of invertase, adding a sufficient amount of a sugar which is substantially non-hygroscopic and which is not converted by the invertase, such as dextrose or lactose to form a stiff dough, and drying at temperatures not exceeding 50° C.

In testimony whereof, I have hereunto set my hand.

LEO WALLERSTEIN.